United States Patent

Cesca et al.

[15] 3,694,420
[45] Sept. 26, 1972

[54] VULCANIZABLE AMORPHOUS OLEFINIC TERPOLYMERS FROM ALPHA OLEFINES AND POLYENES

[72] Inventors: Sebastiano Cesca; Arnaldo Roggero; Walter Marconi, all of San Donato Milanese, Italy

[73] Assignee: Snam Progetti S.P.A., Milan, Italy

[22] Filed: April 23, 1970

[21] Appl. No.: 31,356

[30] Foreign Application Priority Data

April 23, 1969 Italy.....................15876 A/69

[52] U.S. Cl.......260/80.78, 260/79.5 B, 260/666 PY
[51] Int. Cl..............................................C08f 17/00
[58] Field of Search...................................260/80.78

[56] References Cited
UNITED STATES PATENTS 3,527,739  9/1970  Valvassori..............260/80.78

Primary Examiner—James A. Seidleck
Assistant Examiner—Roger S. Benjamin
Attorney—Ralph M. Watson

[57] ABSTRACT

A new amorphous olefinic terpolymer is disclosed which is characterized by high vulcanization velocity and is represented by the formula:

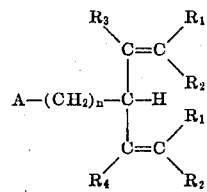

wherein A is a group containing at least one endomethylenic ring, $R_1$, $R_2$, $R_3$ and $R_4$ are members of the group consisting of hydrogen and alkyl radical containing from one to eight carbon atoms and $n$ is 0 to 8.

7 Claims, No Drawings

VULCANIZABLE AMORPHOUS OLEFINIC TERPOLYMERS FROM ALPHA OLEFINES AND POLYENES

The present invention relates to new vulcanizable amorphous olefinic terpolymers from alpha olefines and polyenes, and to method for preparing said terpolymers.

Particularly the objects of the present invention are new terpolymers constituted by ethylene, propylene and a polyenic hydrocarbon containing at least one endomethylene ring and a substituted diene group on said ring.

Terpolymers from ethylene, propylene or other olefines and dicyclo pentadiene or similar compounds containing a double bond in the endomethylenic ring and another one in the ring ortho-condensed with the first one, are well known in the art. Nevertheless it has been noticed that said terpolymers even if they present a high utilization of the diene monomer and excellent stability characteristic with respect to chemical agents and particularly to the action of ozone and of atmospheric agents owing to their low insaturation percentage, nevertheless they present the drawback of a slow velocity of vulcanization. Furthermore sometimes the vulcanization reaction goes on without the possibility of stopping it.

This drawback affects very negatively the terpolymers properties and restricts very much their utilization possibilities since besides affecting polymer characteristics it does not allow covulcanization with other conventional elastomers at high vulcanization velocity.

We have now found, and it is a feature of the present invention, that by substituting for dicyclopentadiene and its homologous compounds a polyene as hereinbefore described, the vulcanization velocity of the obtained terpolymer is more than 100percent higher than the velocity of the terpolymer containing dicyclopentadiene.

The termonomer used in the preparation of the terpolymer according to the present invention may be schematized as follows:

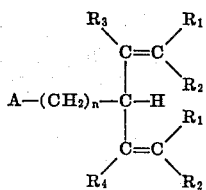

where A is a group containing at least one endomethylenic ring, $R_1$, $R_2$, $R_3$ and $R_4$ may represent hydrogen or alkylic radicals containing from one to eight carbon atoms, $n$ may be 0 or a number ranging from 1 to 8.

A list of termonomers usefully employable according to the present invention is given in the following example by way of illustration but not to limit in any way the present invention:

(1) 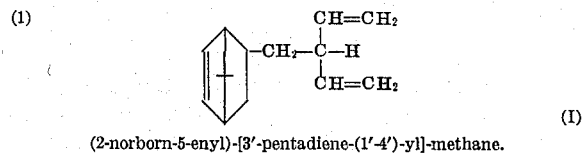

(2-norborn-5-enyl)-[3'-pentadiene-(1'-4')-yl]-methane.

(2) 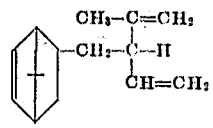

(2-norborn-5-enyl)-[3'-pentadien-(1'-4')-yl-2'methyl]-methane. (II)

(3) 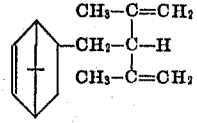

(2-norborn-5-enyl)-[3'-pentadien-(1'-4')-yl-2'-4'dimethyl]-methane. (IV)

(4) 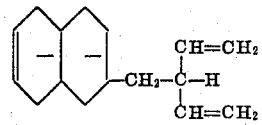

bis-(1,4-5,8-endomethylene)-7-(1,4,5,6,7,8,9,10-octohydro)-naphthalenyl-(3'-pentadien-(1'-4')-yl-methane. (IV)

(5) 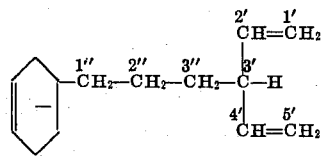

1''(2-norborn-5-enyl)-3''-)3'-pentadien-(1'-4')-yl-propane. (V)

(6) 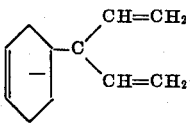

(2-norborn-5-enyl)-divinylmethane. (VI)

These termonomers can be easily prepared (See K. Alder, E. Windemuth, Berichte 71, 1941 (1938); and U. Giannini, E. Pelliro, M. P. Lachi, J. Organometal. Chem. 1968, 12(3), 551-2) and either isomers mixtures or raw reaction products can be also utilized in the preparation of terpolymers.

The alpha olefines employable in the preparation of terpolymers according to the present invention can be chosen among ethylene, propylene, butenes, pentenes, methyl-pentenes and the like.

Preferably ethylene and propylene are utilized.

In the preparation of terpolymers use is made of catalyst systems constituted by a derivative of a transition metal of groups IV to VIII of the periodic system and by reducing compounds of aluminum having the general formula Al R $X_1X_2$. nZ, where R is chosen among either hydrogen or hydrocarbon radicals having from one to 10 carbon atoms; $X_1$ and $X_2$ equal or different may be chosen in the same class of R or can be halogens or derivatives of secondary amines, Z a Lewis base and n can be 1, 2 or 0; furthermore the aluminum derivative can be a polyiminealane as it is described in the Italian Pat. No. 778,353.

The polymerization reaction can be carried out in the presence either of an inert hydrocarbon solvent or of the same monomers (namely alpha-olefines) kept in liquid phase. The catalyst can be preformed in the presence or not of one of the monomers or formed in situ.

Temperature values are those commonly used in this kind of reaction and they can range from −60° C to +100° C. Pressure values range from those necessary to keep at least part of the monomers in liquid phase to 100 atmospheres preferably from 1 to 80 atmospheres.

When the monomers present other than polyenes according to the present invention, comprise ethylene and propylene the preferred ratio between these two monomers ranges from 1 : 4 to 4 : 1 preferably from 1.5 : 1 to 1 : 1.5. The amount of polyene ranges from 1 percent to 20 percent.

The examples hereinafter described are given by way of illustration but do not limit at all the present invention. In said examples the vulcanization reaction behaviors are checked by the torque values registered with a swinging disk vulcameter (Zwick trade mark) as the vulcanization goes on.

The torque is proportional to the vulcanization degree. It is assumed as indicative of the initial unsaturation level the highest variation of the torque in the initial 250 minutes of the vulcanization with respect to the minimum torque registered at the beginning ($G_{250} - G_{min} = G_{max}$); furthermore it is assumed as indicative of the actual concentration of double bonds the difference $G_{250} - G_t$ between the torque value after 250 minutes and the time $t$.

The vulcanization velocity, obtained in such a way, in conditions that we can choose and with an excess of sulfur, is practically dependent only on double bonds concentration.

The registered behaviors correspond to a kinetic equation of the second order:

$$(d\,Gt)/dt = K\,(G_{max} - G_t)^2$$

It is possible to determine the vulcanization velocity constant $K$ when $G_{max}$ and $t_{90}$, time necessary to obtain the 90 percent of $g_{max} - G_{min}$, are known $$K = 1/(G_{max} \times t_{90})$$

EXAMPLE 1

Into a 1500 cubic centimeters tubular reactor, provided with a mechanical stirrer a thermometric sheath and a jacket for the thermostatizing fluid, in an inert atmosphere, 1000 cubic centimeters of n-hexane were introduced.

At the same time a mixture of propylene and ethylene, in a ratio 2 : 1, was introduced into the reactor bottom at a flow rate of 1200 N liters/h, in order to make easier the reaching of the saturation equilibrium the solvent is stirred during the gases insufflation, while its temperature is kept constant at 0° C by the circulation in the reactor jacket of a freezing mixture controlled by a cryostat.

With 20 minutes bubbling of the monomers mixture it is possible to assume that equilibrium condition are reached. Successively 3.2 mmoles/1$t$ of $(C_2H_5)_2AlCl$ and 11.5 mmoles/1$t$ of (2-norborn-5-enyl)- [-3'-pentadien (1'-4')-yl ]-methane (it is the first compound indicated with I in the list previously given of termonomers usefully employable according to the present invention) were introduced into the reactor; while the gaseous monomers stream was flowing the polymerization reaction was started by the introduction of 0.4 mmoles/1$t$ of vanadium triacetylacetonate dissolved in toluene.

The polymerization was carried out for 9 minutes; it was stopped by the addition into the reactor of 1 cubic centimeter of n-butanol. The reaction solution was washed with an aqueous solution of HCl and then with water to neutralization, afterwards it was coagulated by slowly pouring an acetone excess mixed with AO 4010 amino antioxidant. After drying at low pressure for 15 hours, an elastomeric product looking like an unvulcanized rubber and weighing 14 gr. was obtained.

Under X-ray examination it was found to be entirely amorphous and revealed an $O_2$ content of 60 percent, whereas the determination of intrinsic viscosity effected in toluene at 30° C gives a value of $[\eta] = 1.3$ dl/gr.

The check of termonomer (I) in the polymer gives 7 percent by weight, by iodometric analysis.

A portion of the terpolymer is subjected to vulcanization in a swinging disk reometer (Zwick trade mark) with a torsion angle of 21.5° according to the following formulation:

| | | |
|---|---|---|
| Polymer | 100 parts | |
| HAF | 50 parts | |
| ZnO | 5 parts | |
| Circosol 4240 | 5 parts | |
| MBT | 0.5 parts | (MBT = mercaptobenzo-/thyazole) |
| TMST | 1 parts | (TMST = tetramethylthi-uramedisulfide) |
| Sulfur | 2 parts | |
| Vulcanization temperature 145°C | | |

The obtained results are the following ones:

$t_i$ = (induction time) 30"
$t_{90}$ = (time necessary to obtain the 90 percent of the maximum modulus) 28'
$K$ = (total reaction velocity constant for vulcanization) 0.83 (min.$^{-1}$ m$^{-1}$ kg$^{-1}$)
$G_{max}$ = (maximum torque registered at the end of the vulcanization) 0.52 m. kg.

For the purpose of comparison, a terpolymer sample, based on dicyclopentadiene, was prepared by working with modalities analogous to those previously described; the sample gave $[\eta] = 1.20$ dl/gr. and 6.5 percent of dicyclopentadiene.

After vulcanization under the same conditions above mentioned, the following results were obtained:

$t_1$ = 5 minutes
$t_{90}$ = 101' 30"
$K$ = 0.123 (min$^{-1}$kg$^{-1}$ m$^{-1}$)
$G_{max}$ = 0.488 (m. kg.)

Said results pointed out, the highest vulcanization velocity of terpolymers based on compounds as shown in (I).

EXAMPLE 2

The test of the example 1 was repeated with the only difference that a half amount of compound (I) was used. In a 9 minutes terpolymerization 20 gr. of terpolymer having a (I) content of 3.9 percent by weight, an intrinsic viscosity of 1.39 dl/gr. and a $O_2$ content of 60 percent, were obtained.

The following technological data were obtained:
$t_i$ = 1'
$t_{90}$ = 37'
$K$ = 0.75 (min$^{-1}$ kg$^{-1}$ m$^{-1}$)
$g_{max}$ = 0.380 m/kg

EXAMPLE 3

With the same apparatus of the preceding example a terpolymer was obtained using (2-norborn-3-enyl)- [5'-pentadien-(1'-4')-yl-2'-methyl]methane, indicated with II in the list given above of termonomers usefully employable according to the invention, and toluene in the place of n-hexane and as the catalytic system VO(O But)$_3$ (1 mmole/1$t$)-Al(C$_2$H$_5$)$_2$Cl (10 mmoles/1$t$). The amount of termonomer was 5.32 mmoles/1$t$.

In a 8' terpolymerization 21.5 gr. of terpolymer having (II) content of 3.7 percent by weight an intrinsic viscosity of 1.45 dl/gr. and an ethylene content of 65 percent were obtained. The following technological data were obtained:
$t_i = 1'$
$t_{90} = 35'$
$K = 0.85$ (min$^{-1}$ kg$^{-1}$ m$^{116}$ $^1$)
$G_{max} = 0.485$ m. kg.

EXAMPLE 4

Operating with n-heptane at $-20°$ C with VCl$_4$(0.5 mmoles/1$t$-Al(C$_2$H$_5$)$_2$Cl(4 mmoles/1$t$) and anisole (2 mmoles/1$t$ and using 5 mmoles/1$t$ of 2-norborn-5-enyl)- [-3'-pentadien-(1'-4')-yl-(2'-4')-dimethyl ]-methane, the compound indicated as (III), in 4' minutes, 20 gr. of terpolymer having [$\eta$] = 2.0 dl/gr. termonomer content of 4.1 percent and C$_2$H$_4$ of 54 percent were obtained.

Technological data are:
$t_i = 1'$
$t_{90} = 40'$
$K = 0.82$ (m$^{-1}$ kg$^{-1}$ min$^{-1}$)
$G_{max} = 0.460$

EXAMPLE 5

The test of the preceding example was repeated with the difference that the termonomer (III) was portioned so as to add 0.625 mmoles every 30'' till depletion of the termonomer; in 4 minutes 21 gr. of terpolymer having [$\eta$]= 2.1 dl/gr., a 4.18 percent by weight of III and 55 percent of C$_2$H$_4$ were obtained.

Technological data were:
$t_i = 2'$
$t_{90} = 40'$
$K = 1.03$ (m$^{-1}$ kg$^{-1}$ min$^{-1}$)
$G_{max} = 0.480$

EXAMPLE 6

Using V(Acac)$_3$ (0.4 mmoles/1$t$) and Al(C$_2$H$_5$)$_2$Cl (3.2 mmoles/1$t$), n-heptane (1000 cm$^3$) and 5 mmoles/1$t$ of 1''(2-norbor-5-enyl)-3'-[3'-pentadien-(1'-4')-yl]-propane, indicated by V, in 9' minutes 19.5 gr. of terpolymer [$\eta$]= 1.32 dl/gr. a termonomer content of 4.15 percent by weight are obtained.

EXAMPLE 7

Using 6 mmoles of (2-norborn-5-enyl)-divinyl-methane indicated by VI and portioned so as to add 1 mmole every minute till depletion of the monomer, with VO(O-n-C$_4$H$_9$)$_3$ (0.8 mmoles/1$t$) and Al(C$_2$H$_5$)$_2$Cl (8 mmoles/$t$) in toluene, in 6' minutes 14 gr. of terpolymer having [$\eta$]= 1.98 dl/gr., C$_2$H$_4$ = 60 percent by weight and termonomer = 4.2 percent by weight are obtained.

What we claim is:

1. A vulcanizable amorphous olefinic terpolymer presenting high vulcanization velocity comprising ethylene, an alpha olefine having from three to six carbon atoms and a polyenic hydrocarbon selected from the group consisting of (2-norborn-5-enyl)-[-3'-pentadiene-(1'-4')-yl]-methane, (2-norborn-5-enyl)-[-3'-pentadien-(1'-4')-yl-2'-methyl]-methane, (2'- -norborn-5-enyl)[-3'-pentadien-(1'-4')-yl-2',4'-dimethyl]-methane, 1''(2-norborn-5-enyl)-3''-[3'-pentadien-(1'-4')-yl-]propane and (2-norborn-5-enyl) divinyl-methane.

2. A vulcanizable amorphous olefinic terpolymer according to claim 1 in which the polyenic hydrocarbon is (2-norborn-5-enyl)- [-3'-pentadiene-(1'-4')-yl] - methane.

3. A vulcanizable amorphous olefinic terpolymer according to claim 1 in which the polyenic hydrocarbon is (2-norborn-5-enyl)- [-3'-pentadien-(1'-4') -yl-2'methyl]-methane.

4. A vulcanizable amorphous olefinic terpolymer (2'to claim 1 in which the polyenic hydrocarbon is (2'-norborn-5-enyl)- [-3'-pentadien-(1'- 4')-yl-2',4'-dimethyl] -methane.

5. A vulcanizable amorphous olefinic terpolymer according to claim 1 characterized in that the polyenic hydrocarbon is 1''(2-norborn-5-enyl)-3''- [3'-pentadien-(1'-4')-yl-] propane.

6. A vulcanizable amorphous olefinic terpolymer according to claim 1 characterized in that the polyenic hydrocarbon is (2-norborn-5-enyl) divinyl-methane.

7. A vulcanizable amorphous olefinic terpolymer according to claim 1 characterized in that the amount of polyene in the terpolymer ranges from 1 percent to 20 percent by weight.

* * * * *

UNITED STATES PATENT OFFICE
CERTIFICATE OF CORRECTION

Patent No. 3,694,420    Dated September 26, 1972

Inventor(s) Sebastiano Cesca, et al

It is certified that error appears in the above-identified patent and that said Letters Patent are hereby corrected as shown below:

Column 2, line 11, change "IV" to read --III--.

line 15, change example "(4)" to read:

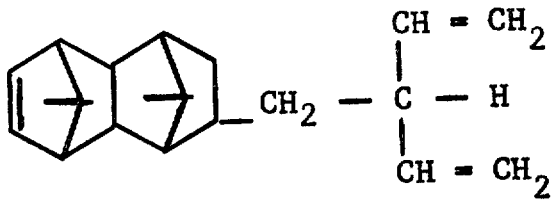

line 20-25, change example "(5)" to read:

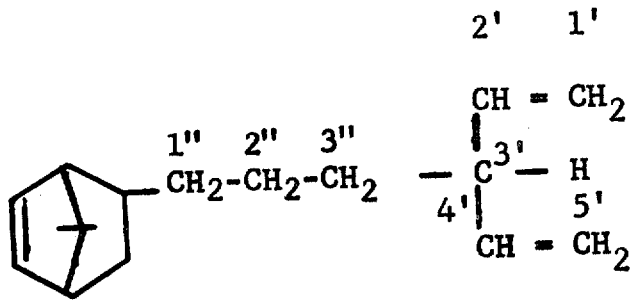

lines 26-30, change example "(6)" to read:

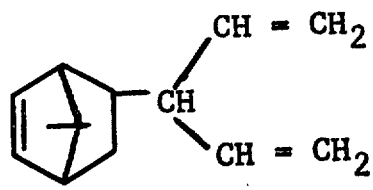

UNITED STATES PATENT OFFICE
CERTIFICATE OF CORRECTION

PO-1050
(5/69)

Patent No. 3,694,420     Dated September 26, 1972

Inventor(s) Sebastiano Cesca, et al     Page - 2

It is certified that error appears in the above-identified patent and that said Letters Patent are hereby corrected as shown below:

Column 4, line 66, after "using" correct the remainder of the line to read --(2-norborn-5-enyl)- [3'--.

Column 5, line 12, correct the line to read

-- $K = 0.85 \ (min^{-1} \ kg^{-1} \ m^{-1})$ --.

Column 6, line 9, beginning of the line "(8 mmoles/t" should read -- (8 mmoles/lt) --.

line 34, cancel "(2'" (first occurrence) and insert -- according --.

Signed and sealed this 19th day of March 1974.

(SEAL)
Attest:

EDWARD M. FLETCHER, JR.
Attesting Officer

C. MARSHALL DANN
Commissioner of Patents